July 22, 1969   J. D. BREWIN   3,457,055
METHOD OF BENDING SHEET GLASS WITH GAS PRESSURE CUSHIONS
Filed April 25, 1966   2 Sheets-Sheet 1
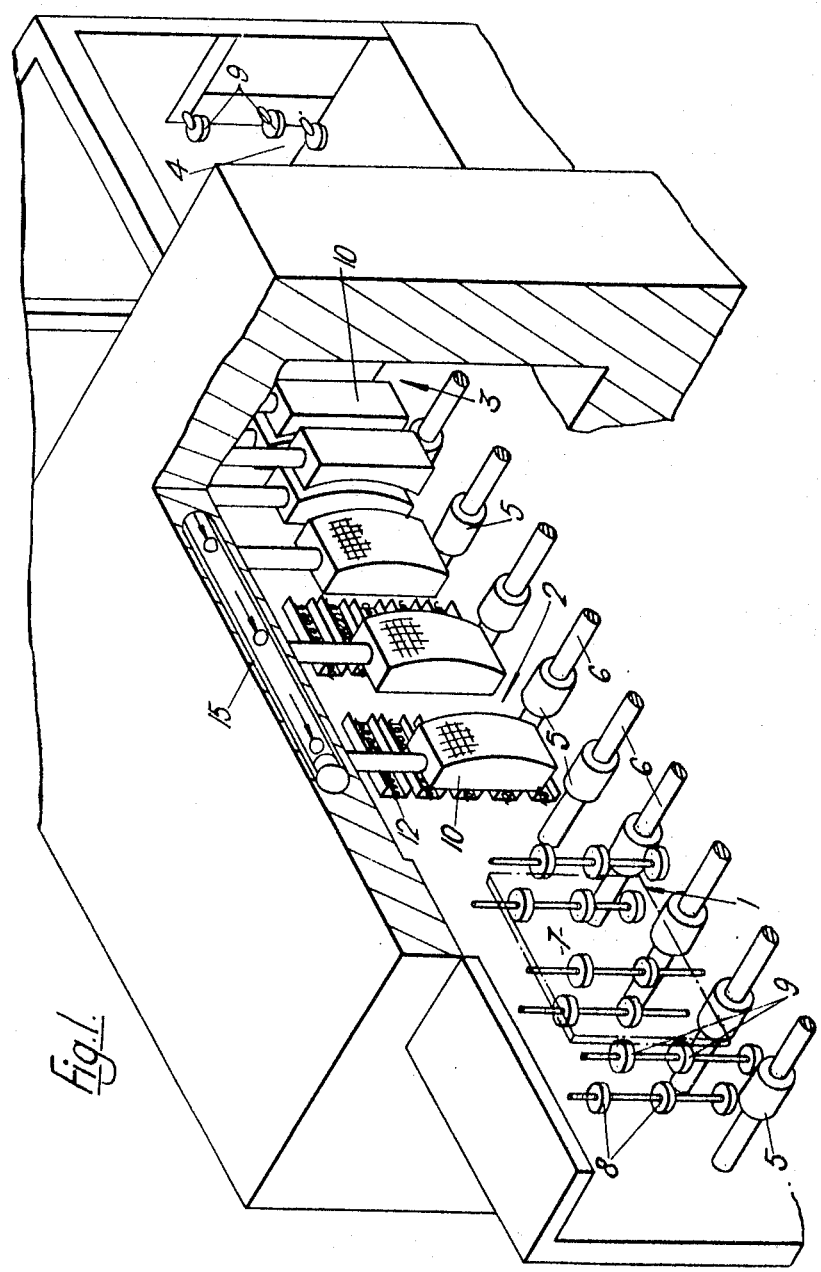
Inventor
John Dennis Brewin
By
Morrison, Kennedy & Campbell
Attorneys

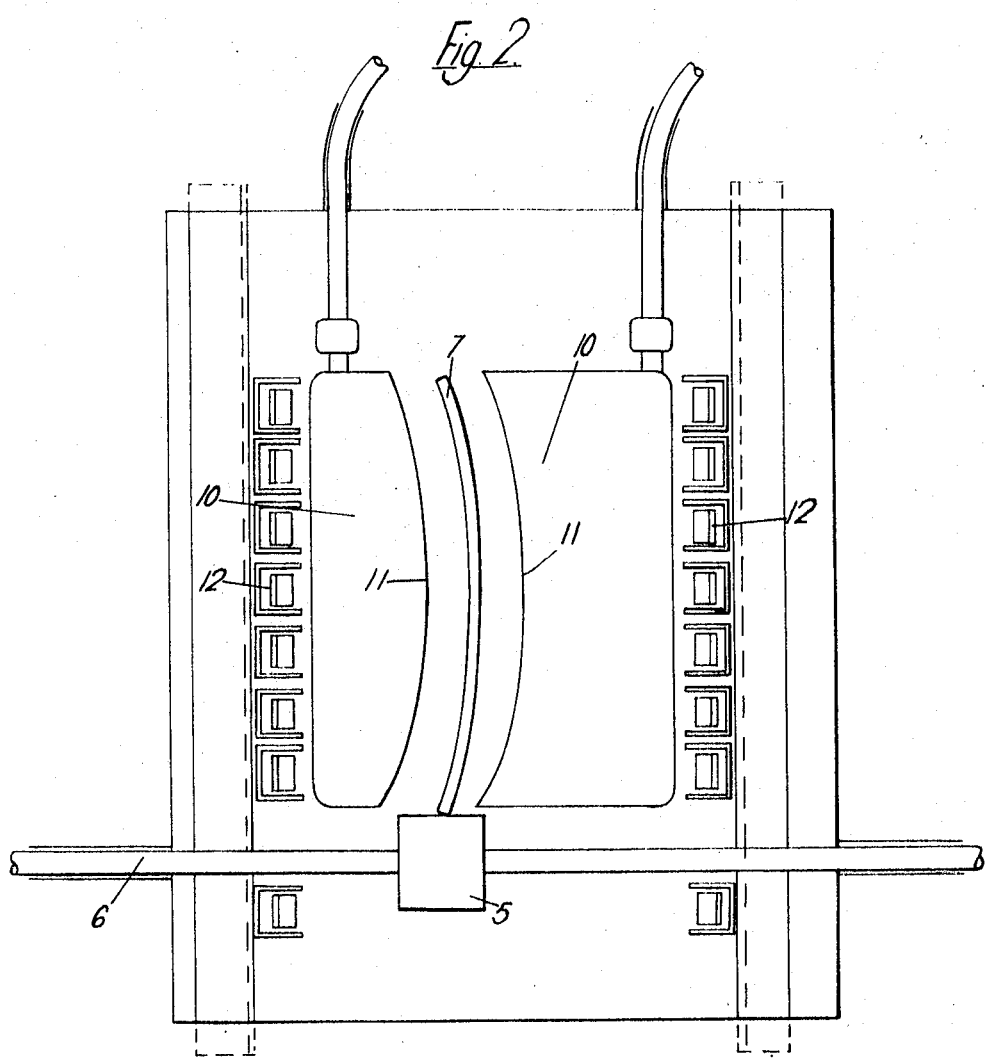

United States Patent Office 3,457,055
Patented July 22, 1969

3,457,055
METHOD OF BENDING SHEET GLASS WITH GAS PRESSURE CUSHIONS
John Dennis Brewin, St. Helens, England, assignor to Pilkington Brothers Limited, Liverpool, England, a company of Great Britain
Filed Apr. 25, 1966, Ser. No. 545,159
Claims priority, application Great Britain, Apr. 30, 1965, 18,337/65
Int. Cl. C03 23/02
U.S. Cl. 65—106       5 Claims

ABSTRACT OF THE DISCLOSURE

Vertically disposed sheets of glass are advanced edgewise on a conveyor, are heated to deformation temperature and then subjected to differential gas pressures to bend the sheets to a desired configuration.

---

This invention relates to methods and apparatus for bending glass in sheet form.

Generally speaking, there are two methods of manufacturing bent glass, for example curved glass. In one method, the glass is supported on a substantially horizontal frame and the bending is effected by heat treatment of the glass which causes the glass to sag under the action of gravity onto the configuration of the frame and conform to that configuration. The alternative procedure is well known in which the glass to be bent is held vertically, usually suspended by tongs, between complementary bending dies. In this arrangement the glass suspended in a vertical plane is withdrawn from the furnace to be in the path of advance of complementary dies which are then forcefully applied to the surfaces of the glass to make the glass conform to the configuration of the dies.

In the first of these cases, at least a peripheral region on one surface of the glass tends to become marred by contact between part of that surface and the frame which is supporting the weight of the glass sheet through the said peripheral region during the bending operation, while, in the other case, the tongs used for suspending the glass mark the glass surfaces and produce distortion in the neighbouring areas of the glass, and the forceful application of the bending dies to the surfaces of the glass sheet to bend the glass is found to introduce surface marring of the glass sheet.

It is a main object of the present invention to provide a method of bending glass in sheet form to a desired shape in which method the surfaces of the glass sheet are not substantially marred during the bending operation.

In accordance with the present invention, a desired configuration is imposed on glass in sheet form by creating across the thickness of at least a part of the area of a heated glass sheet a pneumatic pressure difference sufficient to bend the selected area of the glass sheet to the desired configuration.

According to one aspect of the present invention there is provided a method of imposing a desired configuration on a heated glass sheet, wherein gas streams act on at least part of both surfaces of the glass sheet, modifying pressure distribution of gases over the glass surfaces until a new pressure distribution is created across the thickness of the glass sheet sufficient to cause the glass sheet to adopt the required new shape.

The glass sheet may be maintained in a balanced position during the bending process by subjecting at least a part of each face of the glass sheet to a gas pressure comprising said pneumatic force, whereby there is created across the thickness of a desired area of the glass sheet a pressure difference sufficient to cause the glass sheet to bend while the glass sheet is maintained in a substantially vertical position.

Further a method of glass bending according to the invention may include the steps of displacing the glass along an intended path of travel along which the pressure differences created in the travelling glass vary as the glass is advanced, until the glass sheet is caused to adopt a desired configuration.

In a particular method of glass bending according to the invention there may be created in selected areas of the glass variations in the pressure difference existing across the thickness of the glass.

More particularly the invention may be characterised by creating areas of greater pressure differences in the opposite margins of the glass than are maintained in the central area of the glass.

In accordance with the present invention there is further provided a method of bending glass in sheet form comprising the steps of disposing a glass sheet heated to a temperature at which the glass may be deformed between two gas distributing surfaces, using the tendency of the glass to seek the curved surface of pressure equilibrium when subjected to differential gas pressures over the opposed surfaces of the sheet by gas from the distributing surfaces to cause the glass sheet to adopt a desired curved shaped, and, while the glass sheet is maintained in said desired curved shape by gaseous forces, reducing the temperature of the curved glass sheet until the glass is substantially rigid.

It will be understood that, along each horizontal line connecting directly opposed points on the two gas distributing surfaces, there will, in the absence of any physical obstruction along that line, be a point at which the pressure experienced from the gas emitted from one surface is exactly balanced by the pressure experienced from the gas emitted from the other surface, so that there is no resultant pressure force at that one point. The "curved surface of pressure equilibrium" is the surface in which all these points lie, the curvature of this notional surface being chosen to produce a desired curvature in the bent glass sheet.

Advantageously the glass sheet is supported during the bending operation by having its lower edge only in contact with the support and is maintained in this position by mobile layers of gas, for example air, constituting gas cushions simultaneously in contact with both faces of the heated glass sheet. By this method, any contact between the surfaces of the glass sheet and a solid body is avoided during the bending operation.

According to this aspect, therefore, the present invention provides a method of bending glass in sheet form comprising the steps of advancing a glass sheet supported edgewise on a conveyor through a heating zone wherein the glass is heated to a temperature near its softening temperature, subjecting each surface of the glass to the action of mobile layers of gas constituting cushions of gas under pressure simultaneously in contact with both faces of the heated glass sheet, the cushions applying pneumatic forces to the heated glass sheet, whereby the heated glass sheet is caused to adopt a desired curvature by the differences in pressure of the gases constituting the respective cushions, and the said cushions also maintain the glass sheet in a balanced position during said advance, and stabilising the curved glass sheet by reducing the temperature of the glass while the curved glass sheet is in contact with cushions of gas having substantially complementary curved contour surfaces of pressure which maintain the desired curvature in the curved glass sheet.

The curved contour surfaces of pressure may be provided by using plane perforated surfaces and passing gas at different pressures through different portions of the surface in order to achieve the particular contour surfaces desired. More conveniently, however, the gas is fed through opposed curved perforated surfaces at a similar pressure over each of the surfaces and the curved contour surfaces of pressure are set up in this way.

In general it is well known that existing methods of bending glass, for example the horizontal and vertical methods previously referred to, may be used in conjunction with a quenching process to obtain bent toughened or tempered glass. Similarly the process according to the present invention may be used in conjunction with a quenching process operating immediately on the curved glass before this has been allowed to cool to obtain bent or curved tempered glass sheets. The present invention therefore also comprehends a method of bending and tempering a series of sheets of glass, wherein the individual sheets are advanced by a conveyor with the glass sheets supported edgewise by the conveyor through heating and quenching zones, the glass sheets being maintained in a substantially vertical plane throughout said advance, and at least a part of the area of each sheet is subjected to a pneumatic force when the glass sheet is at a temperature at which the glass may be deformed to cause the glass sheet to adopt a desired curvature.

Conveniently the configuration of the curved glass sheet may be set by reducing the temperature of the glass sheet to below the softening point of the glass before the curved glass sheet enters the quenching zone.

More particularly for producing curved toughened glass, the present invention provides a method of bending and tempering a series of sheets of glass, wherein the individual sheets are advanced by a conveyor with the mobile layers of gas constituting cushions of gas under glass sheets supported edgewise on the conveyor through heating and quenching zones, the glass sheets are balanced in a substantially vertical plane during the advance through said heating and quenching zones by providing pressure simultaneously in contact with both faces of the heated glass sheet, the gas cushions at a part of the heating zone where the glass sheets will be at a temperature near the softening point of the glass having complementary curved contour surfaces of pressure, whereby the glass sheet is caused to adopt a desired curvature by the gas constituting said cushions before the curved glass sheet is subjected to the quenching action in the quenching zone.

Advantageously the cushions of gas in the heating zone are continuously supplied with streams of heated gas.

In the preferred method according to the present invention the glass sheet, as already stated, is advanced on a conveyor with the glass sheet in a substantially vertical position. Consequently when the curved contour surfaces of pressure act on the heated glass sheet and deform the sheet, the bending process is assisted by the action of gravity which utilises the weight of the upper part of the glass sheet in order to exaggerate the curvature in the central portion of the glass sheet beyond that which would normally be obtained if the gas pressure were the only force acting.

Therefore if the curved contour surfaces of pressure are in fact arcs of a circle, the glass sheet which is obtained may not conform to the arc of a circle as the radius of the central part of the curved glass sheet produced is substantially less than the radius of the upper and lower sections of the curved glass sheet. However, if a glass sheet having the whole of its surface conforming to the arc of a circle is desired, such a curved glass sheet may be obtained by suitably varying the pressures applied to different parts of the glass sheet, for example by exerting greater differences of pressure between the parts of the respective gas cushions contacting upper and lower marginal parts of the glass sheet than is exerted between the parts of the respective cushions of gas contacting the central portion of the sheet. In this way areas of greater pressure differences are created in the opposite margins of the glass than are maintained in the central area of the glass.

The present invention further comprehends sheets of curved glass and sheets of curved tempered glass produced by methods in accordance with the invention.

There is also comprehended by the present invention apparatus for treating sheets of glass by a method according to the invention. According to one aspect, the apparatus in accordance with the invention may comprise apparatus for treating sheets of glass by a method according to the invention comprising, in combination with a conveyor for the individual sheets, heating means for heating a glass sheet during said advance to a temperature at which the glass may be deformed, and pneumatic means for applying a pneumatic force to at least a part of the surface area of a glass sheet which has been so heated in order to impose a desired configuration on the heated glass sheet.

Alternatively, apparatus in accordance with the present invention may comprise, in combination with a conveyor for the individual sheets, opposed gas emitting surfaces for establishing between the glass sheets and the gas emitting surfaces cushions of gas under pressure to balance the glass sheets during their advance by the conveyor, and heating means for heating the glass sheets being advanced by the conveyor, the gas emitting surfaces at least at the part of the conveyor where the glass is heated to a temperature at which the glass may be deformed being curved, perforated surfaces for maintaining opposed cushions of gas under pressure, the said opposed cushions having similarly curved contour surfaces of pressure, whereby the glass sheets are maintained in a desired predetermined relation with the conveyor by the cushions of gas, and at the same time, caused to adopt a desired curvature by the pressure of gas in said cushions.

More particularly the present invention provides apparatus for bending and tempering sheets of glass comprising, in combination with a conveyor for the individual sheets, opposed heating means in the heating zone for heating the glass sheets during said advance to a temperature at which the glass may be deformed, pneumatic means for applying a pneumatic force to at least a part of the surface area of a glass sheet which has been so heated, and opposed gas emitting means in the quenching zone for chilling the curved glass sheet to toughen the glass.

Alternatively the apparatus for bending and tempering sheets of glass may comprise, in combination with a conveyor for the individual sheets, opposed heating means in the heating zone, a plurality of pairs of gas boxes located in each zone and spaced apart in parallelism with the path of the sheets for projecting towards the glass sheets cushions of gas under pressure to balance the glass sheets during their advance by the conveyor, the gas emitting surfaces at least at the part of the conveyor where the glass is heated to a temperature near to the softening point of the glass having opposed similarly curved perforated surfaces for directing gas against the sheets to provide mobile layers of gas under pressure, having complemental curved contour surfaces of pressure, and constituting cushions of gas to cause the glass sheets to adopt a desired curvature by the pressure of gas in said cushions.

The curve which it is desired to produce in the glass sheet may be produced in accordance with the present invention as a curve about a vertical axis or a curve about a horizontal axis. In the case where the curve is produced about a horizontal axis and the desired curve in the glass sheet has the contour of an arc of a circle, the said curved perforated surfaces comprise a main substantially cylindrical surface and marginal portions at the upper and lower edges of the surfaces having a lesser radius of curvature than the said main substantially cylindrical surface.

The perforated surfaces between which the glass is passed may be metal surfaces with a multiplicity of small holes drilled therein. Or, alternatively, they may be metal surfaces with vertical slots at right-angles to the axis of the curve. As the alternative to using metal surfaces, porous materials such as ceramic materials may be used.

In order that the invention may be more clearly understood, the following detailed description of a preferred embodiment thereof is given by way of example with reference to the accompanying diagrammatic drawings in which:

FIGURE 1 is a perspective view partly cut away of apparatus for bending and tempering a glass sheet by a method according to the present invention, and FIGURE 2 is a cross-section through the apparatus of FIGURE 1 taken along the line II—II.

In the drawings like reference numerals designate the same or similar parts.

Referring to the drawings there is shown apparatus for bending and tempering glass in sheet form in which a series of sheets of glass is conveyed through the apparatus. The apparatus comprises a loading section indicated generally by the reference numeral 1, a heating zone indicated generally by the reference numeral 2, a quenching zone 3 and a take-off section 4. A series of rollers 5 each mounted on a driving shaft 6 acts as a conveyor for conveying a glass sheet such as the sheet 7 through the apparatus. The sheet 7 is placed on the rollers 5 and is maintained in a vertical position in the loading section 1 by the two series of freely rotatable discs 8 and 9.

A continuous operation of the apparatus is preferred so that the rollers 5 continuously rotate to advance the glass sheet 7 through the loading section 1 into the heating zone 2 where the glass is balanced vertically by mobile layers of gas under pressure forming gas cushions which are maintained by streams of gas from gas boxes 10. The gas used in conveniently air, carbon dioxide or products of combustion alone or mixed with air.

The gas boxes 10 are arranged in pairs in the heating zone and in FIGURE 1 only one of the gas boxes in each pair is shown. Referring to FIGURE 2, however, it may be seen that the gas boxes 10 have opposed similarly curved surfaces 11 which are perforated so that gas from the boxes may be projected through the surfaces 11 towards the plane sheets of glass entering the heating zone to maintain cushions of gas under pressure against the surfaces of the glass sheets in the heating zone. Because of the similar curved nature of each of the surfaces 11 the gas cushions will seek to produce similar curved contour surfaces of pressure; as long as the glass sheet remains planar between the curved surfaces 11, the contour surfaces of pressure will be similar only in the immediate vicinity of the respective surfaces 11.

There are also provided in the heating zone electric heating elements 12 which are positioned behind the gas boxes 10 so that they direct heat through the gaps between the gas boxes 10 onto the glass sheet as it progresses through the heating zone. In addition to directing heat onto the glass sheet, the heating elements 12 will also heat up the surfaces of the gas boxes 10, which, in the preferred embodiment of the invention, are metal boxes each having a perforated face, and as a result of this heating, the gas boxes 10 will also radiate heat onto the glass sheet passing between the respective pairs of them.

Furthermore the gas which is supplied to the gas cushion through the perforated surfaces 11 of the gas boxes 10 is advantageously at a temperature in the range of 600° C. to 800° C. and in conjunction with the radiant heat supplied to the glass the effect on the glass sheet in the heating zone is to raise this to a temperature greater than 600° C., for example about 700° C., which is a temperature near the softening point of the glass.

The action of the gas cushions formed by the mobile layers of gas under pressure in contact with the surfaces of the glass sheet 7 in the heating zone is firstly to balance the glass sheet in a vertical position so that the glass sheet in the heating zone has no surface contact with a solid surface and the support for the glass sheet is provided by the rollers 5 which engage the lower edge of the glass sheet. The rollers 5 are in edge contact with the glass sheet and not surface contact. In addition, however, the glass sheet when it has been heated to a temperature of the order of 700° C. is able to alter its shape in accordance with the differential gas pressures present in the cushions of gas so that the tendency of the originally plane glass sheet to seek the curved surface of equilibrium between the two air cushions is utilised to cause the glass sheet to adopt a desired curved shape and a camber is imposed on the glass in sheet form.

The gas supplied to the gas boxes 10 through the gas inlet pipes 15 is at such a pressure that a pressure of the order of 8″ to 10″ water gauge exists inside the gas boxes 10 and the clearance between the surfaces of the glass sheet 7 and the surfaces 11 of the gas boxes 10 is kept to a minimum consistent with the necessity for the glass sheet to be able to enter the space between the opposed surfaces 11 of the gas boxes 10 in a linear or planar form without making any contact with the surfaces 11. The distances involved are greatly exaggerated in FIGURE 2 of the accompanying drawings because the degree of curvature imposed on the glass sheet 7 by the varying pressures in the gas cushions is greater than is in fact imparted to the glass in practice. The degree of curvature which is conveniently imparted to a glass sheet fifteen inches high is such that a camber of three eighths of an inch exists in the glass sheet when it is bent towards the curved surface of pressure equilibrium between the opposed curved surfaces 11. The position adopted by the curved glass sheet 7 is shown in FIGURE 2.

In some applications of the present invention, it is necessary for the curved glass sheet to adopt a curve which is the arc of a circle, and this is particularly desirable when the curved glass sheet is to be used as the movable window or sidelight of an automobile having the sides of its body slightly curved. In the production of a curved glass sheet for this purpose by the method just described, the curved perforated surfaces 11 of the gas boxes 10 comprise a main substantially cylindrical surface with surface portions at the upper and lower margins of the surfaces 11 which may have a lesser radius of curvature than the radius of curvature of the main substantially cylindrical surface 11. In this way the tendency of the glass sheet to curve in its marginal portion is accentuated and the glass sheet has a curvature which conforms to an arc of a circle.

The action of the rollers 5 is to convey the glass sheet 7 from the loading section 1 through the heating zone 2 where the glass is heated to a temperature such that it adopts the desired curved shape and then into the quenching zone 3 where the curved glass is balanced in a substantially vertical position by cushions of cold gas at approximately 20° C. and maintained under pressure by streams from the gas boxes 10 in the quenching zone.

The cold gas directed from the gas boxes 10 in the quenching zone also acts as the gaseous chilling fluid for chilling the surfaces of the glass sheet to effect the toughening or chilling of the glass. The cold gas directed from the gas boxes 10 in the quenching zone 3 is preferably at a pressure of the order of fifteen inches water gauge, although this pressure may vary according to the thickness of the glass being tempered or the degree of tempering required. From the quenching zone 3 of the glass sheet is moved by the conveyor rollers 5 into the take-off section of the apparatus where it is again maintained in the vertical position by rotating discs 8 and 9 similar to those employed in the loading section 1 except that the discs 8 and 9 are each disposed in a curved relationship similar to the curvature imposed on the glass sheet during its passage through the apparatus. The curved and tempered glass sheet is then removed from the apparatus.

The arrangement of the heating and quenching zones and the speed at which the glass sheet 7 is conveyed through the zones are chosen so that a satisfactory tempering of the sheet is obtained. For example, it is found that when the heating zone is at a temperature of the order of 700° C., the heating period should last for 2-3 minutes and the glass sheet should then be in the quenching zone for one minute. In practice, the glass sheet will have been quenched sufficiently to become tempered after only 15 to 20 seconds and the remainder of the period in the quenching zone is used in order to cool the glass sheet sufficient for it to be removed manually from the take-off section.

In the embodiment of the apparatus shown, the glass sheet is fed through the heating and quenching zones by the movement of the rollers 5. Equally, however, the glass sheet may be placed on a conveyor member, for example a metal bar arranged to have a series of point contacts with the edge of the glass sheet, and the metal bar carrying the glass sheet 7 be conveyed through the apparatus by the movement of the rollers 5. Such a metal bar has particular use as a conveyor when the glass sheet has an awkward peripheral shape making it difficult to convey by the rollers 5 alone.

In the embodiment of the invention just described, the gas boxes in the heating zone have curvatures for imparting the desired curvature to the glass sheet throughout the heating zone, and therefore the gas boxes are spaced away from each other and from the glass in order to permit the entry of the glass sheet while this is still planar.

However, as the glass sheet is progressively bent during its passage through the heating zone, so the distances by which the gas boxes are spaced away from each other may be reduced.

Alternatively the first part of the heating zone through which the glass sheet is advanced may have straight faced gas boxes for balancing the glass sheet while it is being heated and then the glass sheet at a temperature above the softening point of the glass may be advanced between gas boxes whose faces change in shape progressively from being initially planar to having the full curvature corresponding to the desired curvature in the glass sheet. In this case, the gas boxes will be comparatively closely spaced to permit passage of the glass sheet therebetween at all positions in the heating zone.

In both the embodiments mentioned above, the gas boxes have fixed positions, and in general this is a desirable feature of apparatus in accordance with the present invention. It is however, comprehended by the present invention that the gas boxes which effect the bending of the glass sheet may be advanced simultaneously towards the glass sheet from opposite sides thereof to effect a die bending by the gas cushions in one operation and without any contact of a solid with either of the surfaces of the glass sheet.

By the use of the present invention, it is found that curved temperature glass substantially free from surface blemishes may be obtained and that the tempered glass sheet is toughened substantially symmetrically throughout the thickness of the glass sheet.

Instead of using the conveyor which moves continuously in one direction, it is possible to impart reciprocating motion to the conveyor. The reciprocating motion may take place during the progress of the glass sheet through the heating and quenching zones to equalise the temperature over the surface areas of the glass sheet during the process or it may be a return action of the conveyor at the end of the treatment of a glass sheet.

I claim:

1. A method of bending a glass sheet, comprising heating the glass sheet to a temperature at which the sheet is deformable, employing gaseous forces to maintain the hot glass sheet in a substantially vertical position, subjecting the glass sheet to differential gas pressure distribution over the opopsed upright surfaces of the sheet to bend the glass sheet to a desired curved vertical cross-section, employing said gas pressure distribution on the concave surface of the sheet as it is bent to support the weight of the upper part of the sheet to an extent which relieves that weight acting on the lower part of the sheet, said gas pressure distribution maintaining the curvature of the bent sheet, and reducing the temperature of the vertically disposed bent glass sheet to stiffen the bent sheet while the curvature of the sheet is maintained by said gas pressure distribution.

2. A method according to claim 1 of bending and tempering a series of sheets of glass, wherein the individual sheets are advanced by a conveyor with the glass sheets supported edgewise by the conveyor through heating and quenching zones, the glass sheets being maintained in a substantially vertical plane throughout said advance, and at least a part of the area of each sheet is subjected to said differential gas pressures when the glass sheet is at a temperature at which the glass is deformed to cause the glass sheet to adopt a desired curvature.

3. A method according to claim 1, comprising subjecting the surfaces of a selected area of the heated glass sheet to differential gas pressure sufficient to bend the selected area to the desired curvature.

4. In a method of glass bending according to claim 3, creating areas of greater pressure differences in the opposite margins of the glass than are maintained in the central area of the glass.

5. A method of bending glass in sheet form comprising the steps of advancing a glass sheet supported edgewise on a conveyor through a heating zone wherein the glass is heated to a temperature near its softening temperature, subjecting each surface of the glass to the action of mobile layers of gas constituting cushions of gas under pressure simultaneously in contact with both faces of the heated glass sheet, the cushions applying pneumatic forces to the heated glass sheet, and causing a surface of the heated glass sheet to adopt a desired concave curvature by creating a difference in pressure distribution across the thickness of the glass sheet of the gases constituting the respective cushions sufficient to cause the glass sheet to adopt the desired concave curvature, said cushions also maintaining the glass sheet in a balanced position during said advance, employing said gaseous forces acting on the concave surface of the sheet as it is bent to support the weight of the upper part of the sheet to an extent which relieves that weight acting on the lower part of the sheet, said pressure distribution maintaining the curvature of the bent sheet, and stiffening the curved glass sheet by reducing the temperature of the glass while the curved glass sheet is in contact with cushions of gas having substantially complementary curved contour surfaces of pressure distribution which maintain the desired curvature in the glass sheet.

References Cited

UNITED STATES PATENTS

| | | | |
|---|---|---|---|
| 3,223,499 | 12/1965 | Cypher et al. | 65—106 X |
| 3,223,501 | 12/1965 | Fredley et al. | 65—106 X |
| 3,223,506 | 12/1965 | Wheeler | 65—182 X |
| 3,298,810 | 1/1967 | McKelvey | 65—287 X |
| 3,332,759 | 7/1967 | McMaster et al. | 65—106 X |
| 3,362,806 | 1/1968 | Brewin et al. | 65—182 X |

S. LEON BASHORE, Primary Examiner

R. V. FISHER, Assistant Examiner

U.S. Cl. X.R.

65—25, 114, 287

UNITED STATES PATENT OFFICE
CERTIFICATE OF CORRECTION

Patent No. 3,457,055　　　　　　　　　　　　　　　　　July 22, 1969

John Dennis Brewin

It is certified that error appears in the above identified patent and that said Letters Patent are hereby corrected as shown below:

Column 3, line 35, beginning with "mobile layers" cancel all to and including "zones by providing" in line 39, same column 3, and insert -- glass sheets supported edgewise on the conveyor through heating and quenching zones, the glass sheets are balanced in a substantially vertical plane during the advance through said heating and quenching zones by providing mobile layers of gas constituting cushions of gas under --. Column 7, line 14, "sufficient" should read -- sufficiently --. Column 8, line 4, "opopsed" should read -- opposed --.

Signed and sealed this 21st day of April 1970.

(SEAL)
Attest:

Edward M. Fletcher, Jr.　　　　　　　　　　　WILLIAM E. SCHUYLER, JR.
Attesting Officer　　　　　　　　　　　　　　　　Commissioner of Patents